United States Patent Office 2,745,880
Patented May 15, 1956

2,745,880

PRODUCTION OF POLYPENTAERYTHRITOLS

Edward J. Russell and Franklin B. Wells, Allentown, Pa., assignors to Trojan Powder Company, a corporation of New York No Drawing. Application November 14, 1952,
Serial No. 320,619

2 Claims. (Cl. 260—615)

This invention relates to improvements in the manufacture of polypentaerythritols and more particularly relates to a new process for the preparation of tripentaerythritol and polypentaerythritols of higher molecular weight than that of tripentaerythritol, by the reaction of acetaldehyde, formaldehyde and an added polypentaerythritol in the presence of an alkaline condensing agent.

It has long been known that the reaction of acetaldehyde and formaldehyde in an alkaline medium always produces some polypentaerythritols, and Remensnyder, Bowman and Barth in U. S. 2,441,597 and U. S. 2,441,944 have shown that equilibrium conditions in this reaction can be modified by adding pentaerythritol to the reaction mixture with the production of additional quantities of dipentaerythritol and tripentaerythritol.

Remensnyder, Bowman and Barth have shown that special reaction conditions may be established which increase the yield of tripentaerythritol to an unexpectedly high proportion, as cited by claim 5 of U. S. 2,441,597, but we have found a method by which we are able to produce increased amounts of dipentaerythritol and polypentaerythritols of higher molecular weight under conditions that do not vary substantially from those which are normally obtained in the standard method for the preparation of pentaerythritol.

We have discovered that the desired change in the equilibrium conditions can be brought about by the addition of dipentaerythritol to the reaction mixture.

By the use of methods which do not vary substantially from those employed in the normal procedure for the production of pentaerythritol, Remensnyder et al. in U. S. 2,441,597 and U. S. 2,441,944 show that by adding pentaerythritol to a reaction mixture that would normally produce relatively small amounts of polypentaerythritols, they are able to increase the amount of dipentaerythritol to 23.2% and the amount of tripentaerythritol and polypentaerythritols of higher molecular weight to 11.85%. We have discovered that by initially adding dipentaerythritol only to an acetaldehyde, formaldehyde, sodium hydroxide reaction mixture under substantially these same conditions, we obtain a total product lower in dipentaerythritol than the amount of dipentaerythritol initially present in the reaction mixture, and we therefore conclude that our formed reaction products are free from dipentaerythritol, their composition being substantially 65.7% of monopentaerythritol and 34.3% of tripentaerythritol and higher molecular weight polypentaerythritols.

Accordingly, by our invention we are able to increase the amount of tripentaerythritol and higher molecular weight polypentaerythritols more than 16.5% over the highest amount that can be obtained by following the substantially normal methods of pentaerythritol formation described and claimed in U. S. 2,441,597 and U. S. 2,441,944. Furthermore, we are able to obtain a total yield of pentaerythritols of at least 83%.

In the practice of our invention we prefer to use mixtures of pentaerythritol and dipentaerythritol in the ratios of from equal weights of the two added materials to very high ratios of dipentaerythritol to pentaerythritol, such as 10 parts to 20 parts of dipentaerythritol to each part of monopentaerythritol added. We may even use dipentaerythritol alone as an added reagent, in this case obtaining the maximum possible yield of tripentaerythritol and polypentaerythritols of higher molecular weight.

In general, our invention differs from the inventions of Remensnyder et al. as described and claimed in U. S. 2,441,597 and U. S. 2,441,944, primary in our employment of a mixture of pentaerythritol and dipentaerythritol which is high in dipentaerythritol, or of dipentaerythritol alone, as an addition to the reaction mixture at the beginning of the reaction or during the course of the reaction, but we prefer to employ slightly different ratios of acetaldehyde and formaldehyde present in our reaction mixtures than are used by Remensnyder et al., and in the preferred embodiment of our invention we prefer to employ approximately 4 to 4.5 molecular proportions of formaldehyde to each molecular proportion of acetaldehyde, as we obtain maximum production of polypentaerythritols within this range. In general, also we find that the ratios of alkaline condensing agent to acetaldehyde and formaldehyde used by Remensnyder et al. are satisfactory, although we find optimum production of polypentaerythritols produced by the addition of substantial amounts of dipentaerythritol to our reaction mixture to be when we employ 1.5 moles of sodium hydroxide to 1 mole acetaldehyde.

As in the invention of Remensnyder et al., the purpose of our invention is to increase the ratio of polypentaerythritols to the pentaerythritol produced in the acetaldehyde-formaldehyde reaction. We do this, however, by the addition thereto of dipentaerythritol, and we have discovered that this substitution moves the reaction equilibrium much further toward the production of high yields of polypentaerythritols than does the addition of pentaerythritol when substantially normal conditions for the production of pentaerythritol are employed.

Example 1

To a solution of 120 g. formaldehyde (4 moles) in 1,025 g. water was added 125.8 g. of dipentaerythritol containing 4.8% of pentaerythritol, this proportion of dipentaerythritol corresponding approximately to 0.5 mole (0.47 more exactly). While maintaining agitation and the temperature in the reaction vessel of not over 30° C., 44.5 g. (1 mole) of 99% acetaldehyde and a solution of 60 g. (1.5 moles) of sodium hydroxide in 150 g. water were run in simultaneously over a period of two hours. Agitation was continued for 22 hours longer at the end of which time the free aldehyde content of the reaction mixture was approximately 0.2%. A total yield of formed crystalline organic material weighing 116.46 g. (85.64%) was obtained. This comprised 70.6% pentaerythritol, 4.3% dipentaerythritol, and 25.1% tripentaerythritol and polypentaerythritols of higher molecular weight. The yields were 60.5% pentaerythritol, 3.64% dipentaerythritol and 21.5% of tri- and higher molecular weight polypentaerythritols.

Example 2

All conditions were identical with those in Example 1 except that 251.5 g. of dipentaerythritol containing 4.8% pentaerythritol were added. The formed products weighed 112.8 g. (83%) and comprised 65.6% pentaerythritol and 34.4% tripentaerythritol and higher molecular weight polypentaerythritols. The yields were 54.5% pentaerythritol and 28.5% tripentaerythritol and higher molecular weight polypentaerythritols.

To determine the relative effects of adding pentaerythritol and dipentaerythritol, some dipentaerythritol was purified until it was entirely free from pentaerythritol, and this was then used in a run similar to that shown in Example 2 above. The results were substantially the same, the final product containing slightly less pentaerythritol and more tripentaerythritol and higher molecular weight pentaerythritols than were obtained in Example 2.

It will be recognized that our invention is not limited to the specific examples herein disclosed, but is of broad application, and it should accordingly be understood that the scope of our invention is not limited except as indicated in the appended claims.

What we claim is:

1. In the manufacture of mixed pentaerythritols of high proportion of tripentaerythritol, by reaction involving formaldehyde and acetaldehyde in contact with an alkaline condensing agent, the improvement comprising admixing a material selected from the group consisting of dipentaerythritol and a mixture thereof with another pentaerythritol to the reaction mixture at least approximately as early as the beginning of the said reaction and introducing most at least of the alkaline condensing agent and of the acetaldehyde after the addition of the dipentaerythritol, the proportion of dipentaerythritol so admixed being at least equal on the molar basis to the total of any other pentaerythritols in the said material.

2. The process of claim 1 in which the proportion of dipentaerythritol introduced is at least approximately 0.5 mole for 1 mole of the acetaldehyde.

References Cited in the file of this patent

UNITED STATES PATENTS

| | | |
|---|---|---|
| 2,441,597 | Remensnyder et al. | May 18, 1948 |
| 2,441,944 | Remensnyder et al. | May 18, 1948 |
| 2,448,566 | Wyler | Sept. 7, 1948 |